(12) United States Patent
Umeda et al.

(10) Patent No.: US 6,466,385 B1
(45) Date of Patent: Oct. 15, 2002

(54) METHOD AND APPARATUS OF FORMING A MAGNETIC DISK WITH A SERVO SECTOR AND A DATA SECTOR ON A SPIRAL TRACK

(75) Inventors: Yoshio Umeda, Kobe; Ryosuke Shimizu, Hirakata; Syuichi Yoshida, Osaka; Tatsuaki Ishida, Otsu; Kiyokazu Tohma, Hirakata; Keizo Miyata, Kadoma, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/673,900
(22) PCT Filed: Feb. 21, 2000
(86) PCT No.: PCT/JP00/00955
§ 371 (c)(1),
(2), (4) Date: Dec. 7, 2000
(87) PCT Pub. No.: WO00/51113
PCT Pub. Date: Aug. 31, 2000

(30) Foreign Application Priority Data

Feb. 23, 1999 (JP) .......................................... 11-045223

(51) Int. Cl.⁷ ................................................ G11B 5/86
(52) U.S. Cl. .................. 360/16; 360/77.08; 360/78.14; 360/135; 360/48
(58) Field of Search ............................ 360/15, 16, 17, 360/77.08, 78.14, 131, 135, 75, 48; 369/84

(56) References Cited

U.S. PATENT DOCUMENTS

| 3,869,711 A | * | 3/1975 | Bernard et al. ............... 360/17 |
| 4,422,106 A | * | 12/1983 | Sawazaki ..................... 360/17 |
| 4,802,050 A | * | 1/1989 | Miyabayasgi et al. ...... 360/135 |
| 5,583,712 A | | 12/1996 | Brunelle |
| 5,619,387 A | | 4/1997 | Ottesen et al. |
| 5,907,448 A | * | 5/1999 | Watanabe et al. ............. 360/51 |
| 6,058,084 A | * | 5/2000 | Yamamoto et al. ....... 360/77.08 |

FOREIGN PATENT DOCUMENTS

| JP | 56-41528 | | 4/1981 | |
| JP | 61059671 A | * | 3/1986 | .................. 360/17 |
| JP | 4-102267 | | 4/1992 | |
| JP | 9-55016 | | 2/1997 | |
| JP | 9-128942 | | 5/1997 | |
| JP | 10-40544 | | 2/1998 | |
| JP | 10-312647 | | 11/1998 | |
| JP | 10312647 A | * | 11/1998 | .................. 360/17 |

OTHER PUBLICATIONS

Search Report corresponding to application No. PCT/JP00/00955 dated Jun. 6, 2000.
English translation of Form PCT/ISA/210.

* cited by examiner

Primary Examiner—Alan T. Faber
(74) Attorney, Agent, or Firm—RatnerPrestia

(57) ABSTRACT

A magnetic disk apparatus has: a head (2) that performs data recording and playback while moving relative to a magnetic disk (26) rotating at the prescribed speed; an actuator (3) that positions said head relative to said magnetic disk (26); and a controller (4) that detects the position of said head by means of servo sector that have positioning information recorded magnetically on said magnetic disk (1) and performs control to position said actuator (3) by means of this detection signal, wherein said magnetic disk (1) has at least a part in which the arrangement of tracks is spiral. The magnetic patterns on the disk include a servo sector and a data sector both formed on the same spiral track. The servo sector includes burst patterns for servo control.

6 Claims, 11 Drawing Sheets

METHOD AND APPARATUS OF FORMING A MAGNETIC DISK WITH A SERVO SECTOR AND A DATA SECTOR ON A SPIRAL TRACK

This Application is a U.S. National Phase Application of PCT International Application PCT/JP00/00955.

TECHNICAL FIELD

The present invention relates to a magnetic disk apparatus that performs recording and playback by means of a head on a magnetic disk capable of recording and playing back information, and more particularly relates to a format of data tracks on the magnetic disk. This invention further relates to a magnetic information disk provided with data track format information, and a magnetic disk apparatus comprising a magnetic disk to which the format information is transferred and recorded by using the master information desk.

BACKGROUND ART

As personal computers have advanced and come into widespread use in recent years, magnetic disk apparatus such as hard disk drives have come to be widely used as external storage devices because of their large capacity and high speed. Along with the increasing size of computer software and the quantities of data handled, ever larger capacities are also demanded of these magnetic disk apparatuses in their role as external storage devices. Moreover, disk drives offering high speed and large capacity are used not only for computers, but also in digital AV products, etc., that record and play back video and voice data using digital technology, and there is a demand for large-capacity magnetic disks for recording and playing back digital AV information that comprises enormous quantities of data.

Conventional magnetic disk apparatuses will be described below.

FIG. 8 is a schematic diagram showing an example of a conventional magnetic disk apparatus. In FIG. 8, the magnetic disk 1 is the medium on which data is recorded: the magnetic head 2 is means for performing recording and playback of information to and from the magnetic disk 1; the actuator 3 has the magnetic head 2 mounted at its tip, and is means for performing positioning operations to an arbitrary radial position on the magnetic disk 1; the head amplifier 5 is means for detecting and amplifying playback signals from the magnetic head 2; the controller 4 is means for detecting the relative position of the magnetic head 2 with respect to the magnetic disk 1 from the output of the head amplifier 5, and outputting a control signal to position the actuator 3 at the prescribed position on the magnetic disk 1; and the driver 6 is means for supplying a current corresponding to the control signal to the actuator 3.

Further, the actuator 3 is composed of a carriage 3a, suspension 3b, drive coil 3c, and permanent magnet 3d or the like.

The carriage 3a is means for causing oscillating motion with point c as the center of rotation. The suspension 3b is attached to the carriage 3a, and is means for causing the magnetic head 2 to float at a constant distance of several tens of nanometers above the surface of the magnetic disk 1 by means of a floatation mechanism called a slider. The drive coil 3c is means for generating a driving force by means of the permanent magnet 3d provided opposite to it, and as a result rotating the actuator 3. The permanent magnet 3d is means for generating a driving force together with the drive coil 3c and rotating the actuator 3.

Also provided, although not illustrated, are a spindle motor for rotational drive of the magnetic disk 1, an interface section that performs exchange of digital information with the host, a buffer that stores this information for efficient recording and playback to and from the magnetic disk 1, together with a buffer control unit, an information recording and playback circuit, etc.

The operation of a conventional disk apparatus will be described below. When the magnetic disk 1 performs information recording and playback, it is rotated at a given speed (5,400 rpm in this conventional example) by the spindle motor (not illustrated). At this time, the magnetic head 2 is positioned above the magnetic disk 1 by means of the actuator 3, and is maintained in a floating state in the position at which the pressure of the suspension 3b provided at the tip of the actuator 3, and the active force of the airflow between the slider formed integrally with the magnetic head 2 (not illustrated) and the magnetic disk 1 are in balance. Position information (b in the drawing) is recorded in advance on each of the tracks forming concentric circles (one track is shown by a dashed line at a in the drawing) on the magnetic disk 1. The position information b is recorded at fixed intervals on each track, and the magnetic head 2 plays back the position information at fixed time intervals in accordance with the rotation of the magnetic disk 1 (this time interval is called the sampling period, and the reciprocal of the sampling period is called the sampling frequency, which is 5.4 kHz in this conventional example). The area in which this position information b is recorded is called a servo area. Information is recorded in or played back from areas other than these servo areas; these areas are called data areas. The playback signal output from the magnetic head 2 is detected and amplified by the head amplifier 5, and input to the controller 4. In the controller 4, position information is detected from the input signal, the positional error relative to the target track a of the magnetic head 2 at that time is computed, the control amount necessary to drive the actuator 3 in order to reduce this positional error is computed, and a control signal is output. In this case, a control method such as phase compensation, for example, is used. The driver 6 supplies the necessary current to the drive coil 3c of the actuator 3 on the basis of the input control signal. By this means, a driving force is generated by the drive coil 3c and the permanent magnet 3d located opposite, and the actuator rotates about point c and constantly positions the magnetic head 2 above the target track a. In this state, information recording and playback is performed on the data area by the magnetic head 2. When information recording and playback is performed in this way, a closed loop positioning control system that positions the magnetic head 2 above the target track is used.

FIG. 9 shows details of the position information formed in the servo area 7a. In this servo area 7a, track identification information, burst patterns, etc., are recorded as servo information for positioning the head 14 which has a write head 15 and a read head 16. The track identification information is information that denotes the track numbers of each data area; it is read by the magnetic head 2, and makes it possible to determine the track position at which the magnetic head 2 is currently positioned. The burst patterns are a plurality (4 in this conventional example) of patterns with mutually differing phases. On the basis of the signals output from these patterns, the amount of drift of the head 2 is detected, and this is used by the controller 4 to constantly follow the prescribed track and position the magnetic head 2 at that track by controlling the actuator 3. To be specific, AGC 9 is an area for fixing the amplitude of the playback waveform by means of an AGC circuit, Sync 10 is an area for achieving clock synchronization, SAM (Servo Address Mark) 11 is an area that denotes the start position of the servo area, Track No. and Wedge No. 12 are the track number and wedge number called the Gray code, and Burst 13 comprises a burst area for generating intra-track position signals.

Therefore, Track No. and Wedge No. 12 constitute track identification information, and Burst 13 corresponds to the burst patterns. When the head detects the SAM (Servo Address Mark) 11, the Track No. and Wedge No. 12 are detected based on that point in time, and the track number and wedge number are identified, and then the burst signal is detected in Burst 13 at the prescribed point in time from that reference point in time, and head positioning is performed by means of the closed loop control system on the basis of that signal.

FIG. 10 shows an example of a 2-phase servo that generates an intra-track position signal, and generates a reference signal for positioning the head 14 on the basis of that position signal. This example will be explained below.

In track 7, servo areas 7a and data areas 7b follow alternately. The case in which track n+1 of a servo area 7a is recorded and played back by the head 14 will be described below.

After the head 14 has passed AGC 9, Sync 10, SAM 11, and Track No. and Wedge No. 12 of track n+1, burst signals are detected four times within a fixed time interval in Burst 13 for generation of the intra-track position signal. 17 is the first burst signal detected, and the vertical axis is the position in the radial direction from the center of rotation. The ">" shape is the amplitude of the detected signal. Similarly, 18, 19, and 20 denote the detected amplitude of burst signals at the position of the head 14. There are thus four burst signals: A, B, C, and D. 21 comprises the difference between the signal detected at 17 and the signal detected at 18, and is called the N phase. Similarly, 22 is the difference between the amplitude of the signal detected at 19 and the amplitude of the signal detected at 20, and is called the Q phase. The difference in burst signal amplitudes is calculated by means of this pair, N phase 21 and Q phase 22, and the parts of each with high linearity are connected to give a linear phase error signal which is used as the closed loop position control system signal.

In order to perform this kind of preformatting in which servo information is written to a magnetic disk, it is necessary to sequentially position the magnetic head and write the servo information (AGC, Sync, SAM, Track No. and Wedge No., burst patterns, etc.) with a servo track writer. This necessitates highly accurate positioning technology, and at the present time this work requires from several tens of minutes to several hours.

However, the following kinds of problems will arise with the above system.

With the conventional concentric-circle track format, when recording or playing back a large amount of data that is transferred sequentially in time, such as video and voice data, for example, since the data is recorded over a number of tracks, track jump operations (seeks) from one track to the adjacent track are necessary during recording or playback. Conventionally, this takes 20% to 30% of the time required for one disk revolution. Since no recording or playback whatsoever is performed during this time, of course, efficiency becomes extremely poor, and transfer performance falls, when recording or playing back a large amount of data transferred continuously in time. Moreover, when a track jump is normally performed, the next recording or playback can be started within the above-mentioned time, but there are also frequent cases where the operation to stabilize residual oscillation after a track jump (settling) is prolonged, and the next recording or playback position is passed, so that there is a further wait of one revolution. It goes without saying that transfer performance falls further in this case. Maintaining continuous transfer performance during playback of video and voice data is extremely important, and in the above situation, the serious problem of partial halting of video and voice data (frame lapses) will arise.

Also, when a magnetic disk is preformatted, writing to the servo areas by means of a servo track writer requires extremely accurate positioning technology and a large amount of time, and is an obstacle to the mass production of magnetic disks at a low price.

DISCLOSURE OF THE INVENTION

The present invention takes into account the problem of reduced data transfer efficiency and partial loss of data when data transferred continuously in time is recorded or played back, and the problem of the time and cost involved in preformatting magnetic disks, and it is an objective of the present invention to provide a magnetic disk apparatus and master information disk that enable data that is transferred continuously in time to be recorded and played back efficiently, and make it possible for magnetic disk preformatting to be performed in a short time and without cost.

In order to solve the above-mentioned problems, one aspect of the invention is a magnetic disk apparatus comprising:

a head that performs data recording and playback while moving relative to a magnetic disk rotating at the prescribed speed;

an actuator that positions said head relative to said magnetic disk; and a controller that detects the position of said head by means of servo sector that have positioning information recorded magnetically on said magnetic disk and performs control to position said actuator by means of this detection signal, wherein said magnetic disk has at least a part in which the arrangement of tracks having at least said servo sectors is spiral, and a ferromagnetic film or ferromagnetic powder coating phase is formed on the surface of said magnetic disk, and with regard to the master information disk, depressions and projections corresponding to said positioning information are formed on the surface of the disk substrate, and at least the raised surfaces of said depressions and projections are a ferromagnetic medium, and said depressions and projections are formed in a spiral, and by bringing the surface of the master information disk into contact with the surface of said magnetic disk, a magnetized pattern corresponding to said depressions and projections is recorded.

Another aspect of the invention is a magnetic disk apparatus, wherein said magnetic disk comprises an area in which the tracks are formed spirally, and an area in which the tracks are formed in concentric circles.

Still another aspect of the invention is a magnetic disk apparatus, wherein the area in which said tracks are formed in concentric circles is formed on the side nearer the center of rotation of said magnetic disk, and the area in which said tracks are formed spirally is formed on the side further from said center of rotation.

Yet another aspect of the invention is a magnetic disk apparatus wherein the area in which said tracks are formed spirally and the area in which said tracks are formed in concentric circles are arranged with the provision of intervals to prevent said servo sector positioning information of at least said mutually adjacent areas from overlapping.

Still yet another aspect of the invention is a master information disk comprising a disk substrate on which depressions and projections corresponding to positioning information held by the servo sectors are formed, wherein at least the raised surfaces of said depressions and projections are magnetized, and at least part of said depressions and projections are formed in a spiral on said disk substrate, and which is used to record a magnetized pattern corresponding to said depressions and projections on a magnetic disk by being brought into contact with said magnetic disk.

Next, the operation of the present invention will be described.

The magnetic disk apparatus of the present invention comprises a rotating magnetic disk, a head that records and plays back information while moving relative to the magnetic disk, and an actuator that supports the head and moves and positions the head almost radially on the aforesaid magnetic disk in accordance with commands, with the actuator being a device that positions the head in accordance with position information recorded magnetically in servo sectors on the magnetic disk, and the position information being formed spirally on the magnetic disk. By this means, recording and playback are performed with the head following the spiral track, so that recording and playback of large amounts of continuous data, such as video and voice data, can be performed efficiently without track jumps. In addition, revolution waits due to track jumps are also eliminated, with the result that continuous transfer performance is greatly improved and video frame lapses, etc., no longer occur.

Further, the use of the master information disk of the present invention eliminates the need for high-speed, high-precision positioning technology and the time required for writing associated with writing servo sectors with a servo track writer, and makes it possible to reduce the cost of construction of the magnetic disk apparatus of the present invention.

(DESCRIPTION OF REFERENCE NUMERALS)

Figure 1:
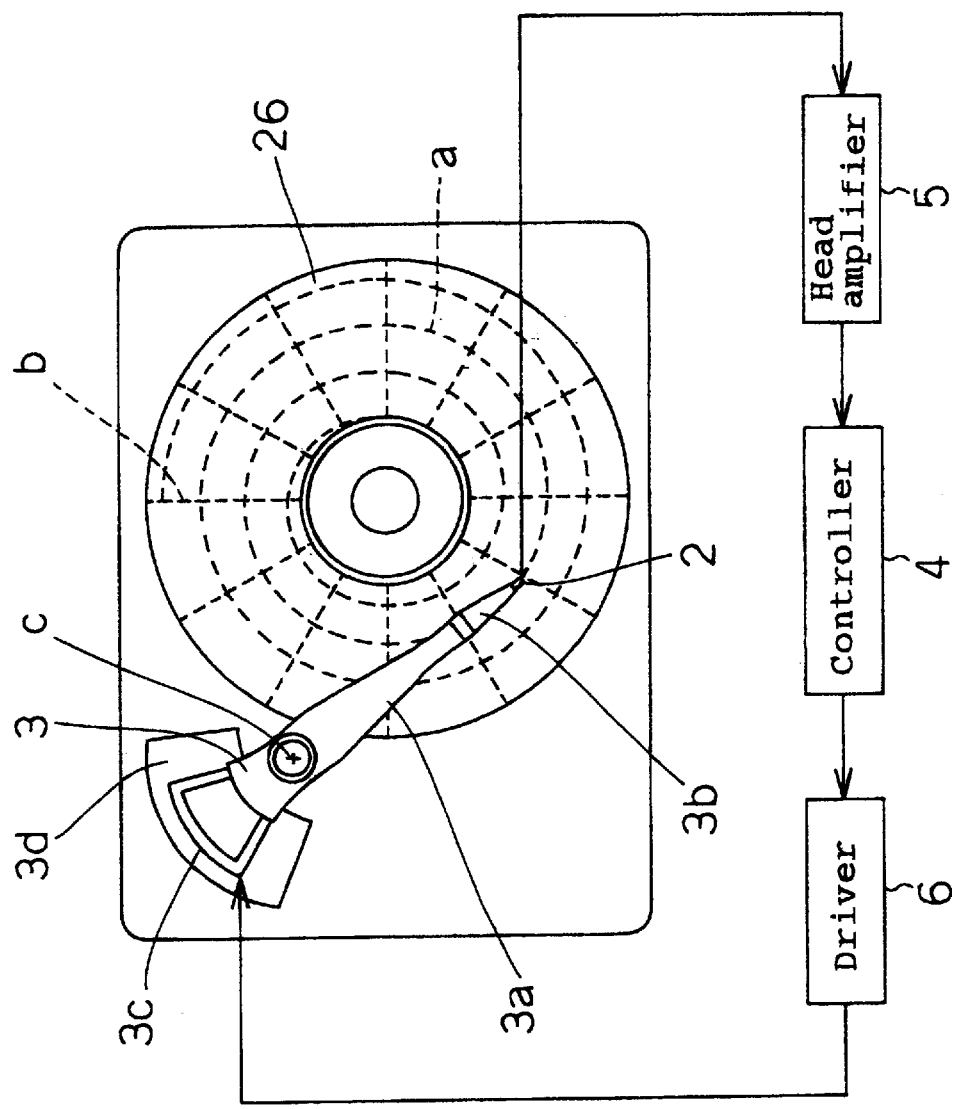
FIG. 1 is a schematic diagram showing the configuration of a magnetic disk apparatus in Embodiment 1 of the present invention.

1 Magnetic disk
2 Magnetic head
3 Actuator
4 Controller
5 Head amplifier
6 Driver
7 Track
7a Servo area
7b Data area
9 AGC
10 Sync
11 SAM
12 Track No. and Wedge No.
13 Burst
14 Head
15 Write head
16 Read head
17 Burst signal A
18 Burst signal B
19 Burst signal C
20 Brst signal D
21 N phase
22 Q phase
23 Seek
24 Settling
25 Tracking
26 Magnetic disk
27 Magnetic disk
28 Magnetic disk
29 Servo area
30 Track
31 Data area
32 Data area
33 Servo area
34 Track
35 Recording magnetic field
36 Master information disk
37 Magnetization of the ferromagnetic material of the projections
38 Recording magnetization
39 Projection
40 Depression

BEST MODE FOR CARRYING OUT THE INVENTION

With reference now to the attached drawings, the embodiments of the present invention will be explained below.

(Embodiment 1)

First, Embodiment 1 will be explained with reference to FIGS. 1, 2, 4 to 7, and 11.

FIG. 1 is a schematic diagram showing Embodiment 1 of the magnetic disk apparatus.

In FIG. 1, the magnetic disk 26 is the medium on which data is recorded, with spiral tracks for recording and playing back video and voice data; the magnetic head 2 is means for performing recording and playback of information on the magnetic disk 26; the actuator 3 has the magnetic head 2 mounted at its tip, and is means for performing positioning operations to arbitrary radial positions on the magnetic disk 26; the head amplifier 5 is means for detecting and amplifying playback signals from the magnetic head 2; the controller 4 is means for detecting the relative position of the magnetic head 2 with respect to the magnetic disk 26 from the output of the head amplifier 5, and outputting a control signal to position the actuator 3 at the prescribed position above the magnetic disk 26; and the driver 6 is means for supplying a current corresponding to the control signal to the actuator 3.

Further, the actuator 3 is composed of a carriage 3a, suspension 3b, drive coil 3c, and permanent magnet 3d or the like.

The carriage 3a is means for causing oscillating motion with point c as the center of rotation. The suspension 3b is attached to the carriage 3a, and is means for causing the magnetic head 2 to float at a constant distance of several tens of nanometers above the surface of the magnetic disk 26 by means of a floatation mechanism called a slider. The drive coil 3c is means for generating a driving force by means of the permanent magnet 3d provided opposite to it, and as a result rotating the actuator 3. The permanent magnet 3d is means for generating a driving force together with the drive coil 3c and rotating the actuator 3.

Also provided, although not illustrated, are a spindle motor for rotational drive of the magnetic disk 26, an interface section that performs exchange of digital information with the host, a buffer that stores this information for efficient recording and playback to and from the magnetic disk 26, together with a buffer control unit, an information recording and playback circuit, etc.

Next, the operation of the present embodiment will be explained.

The magnetic disk 26 is configured such that tracks having servo areas and data areas are arranged spirally.

Figure 8:
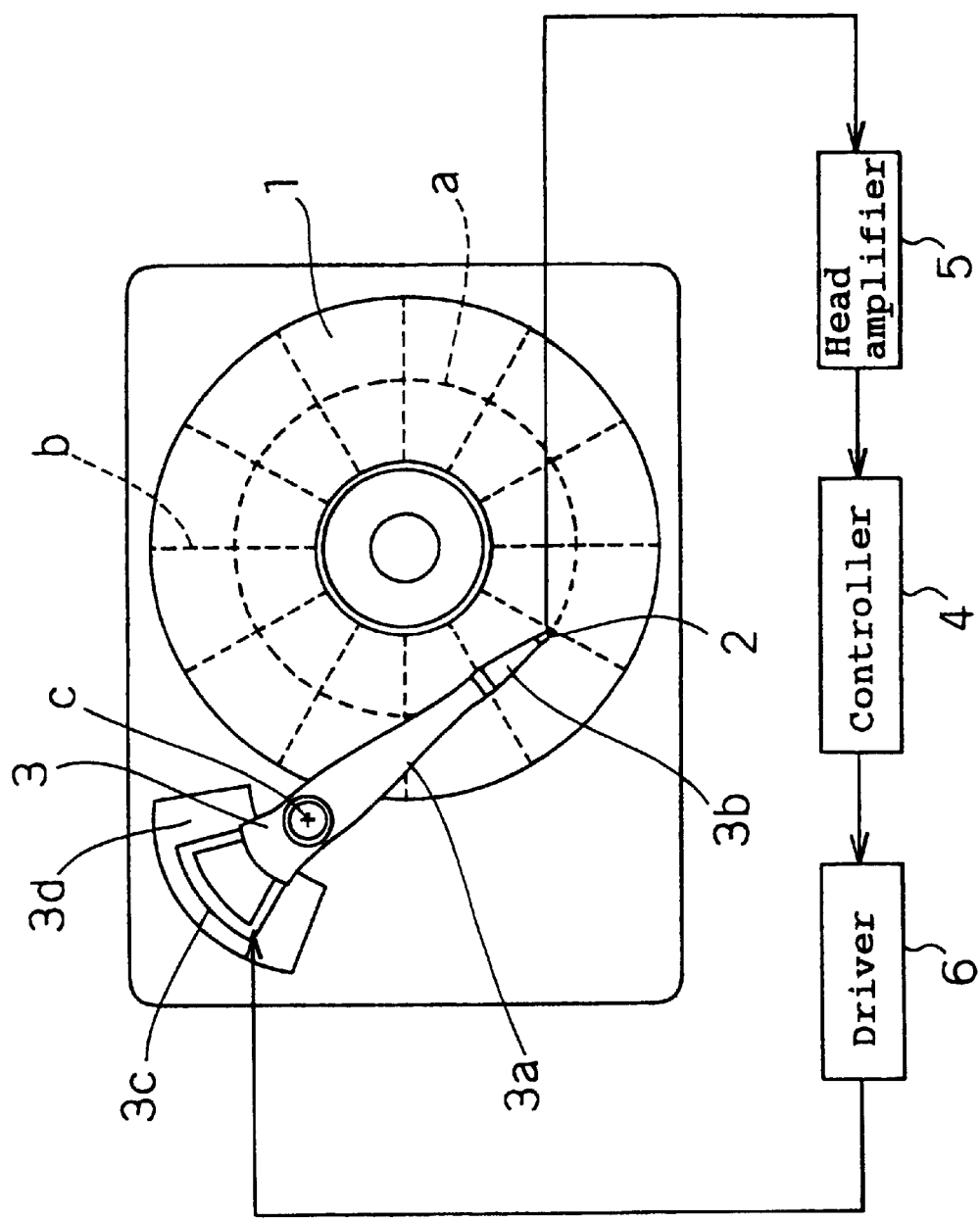
FIG. 8 is a drawing showing the general configuration of a conventional magnetic disk apparatus.
Figure 9:
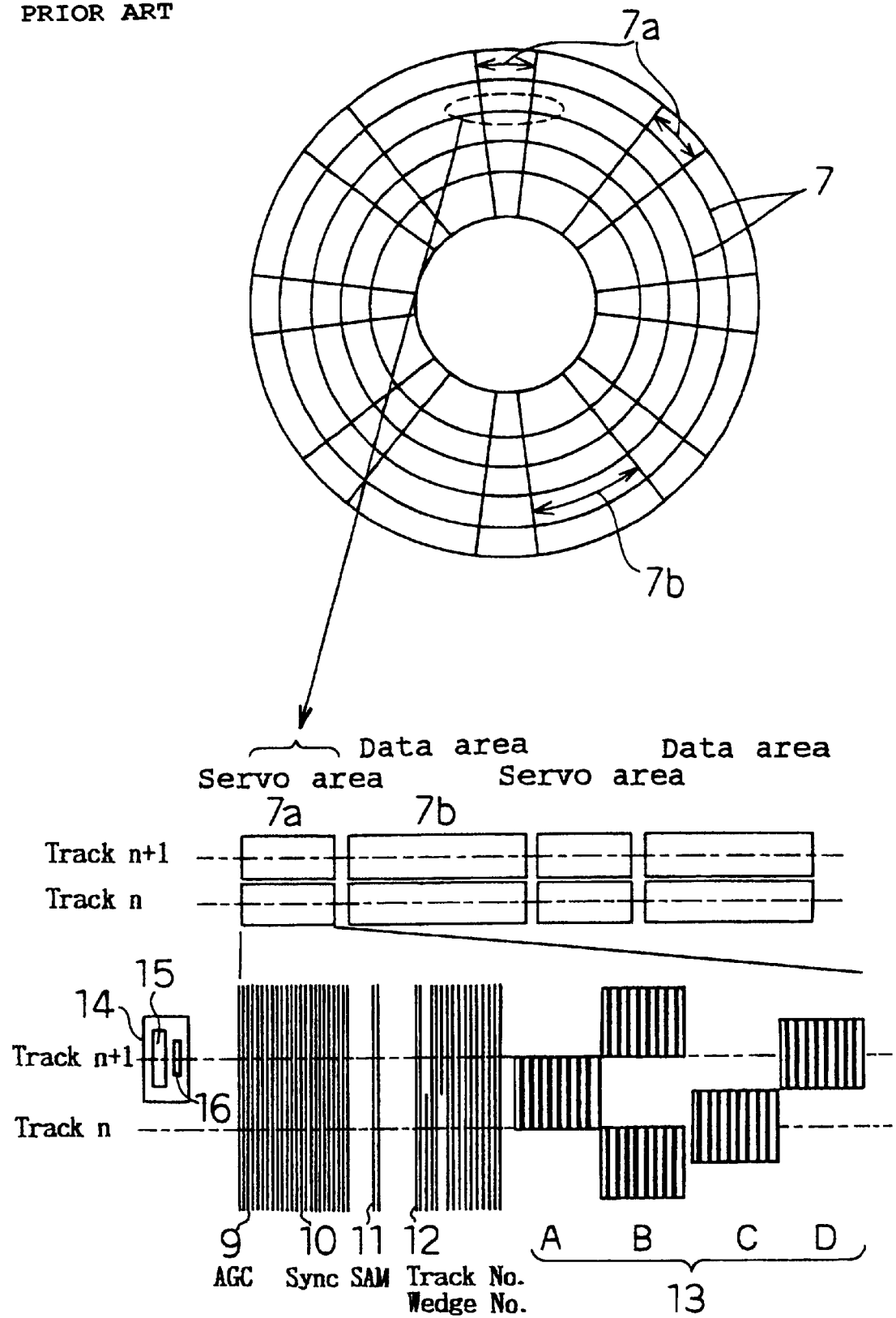
FIG. 9 is a drawing showing magnetized patterns in servo areas of a conventional magnetic disk.
Figure 10:
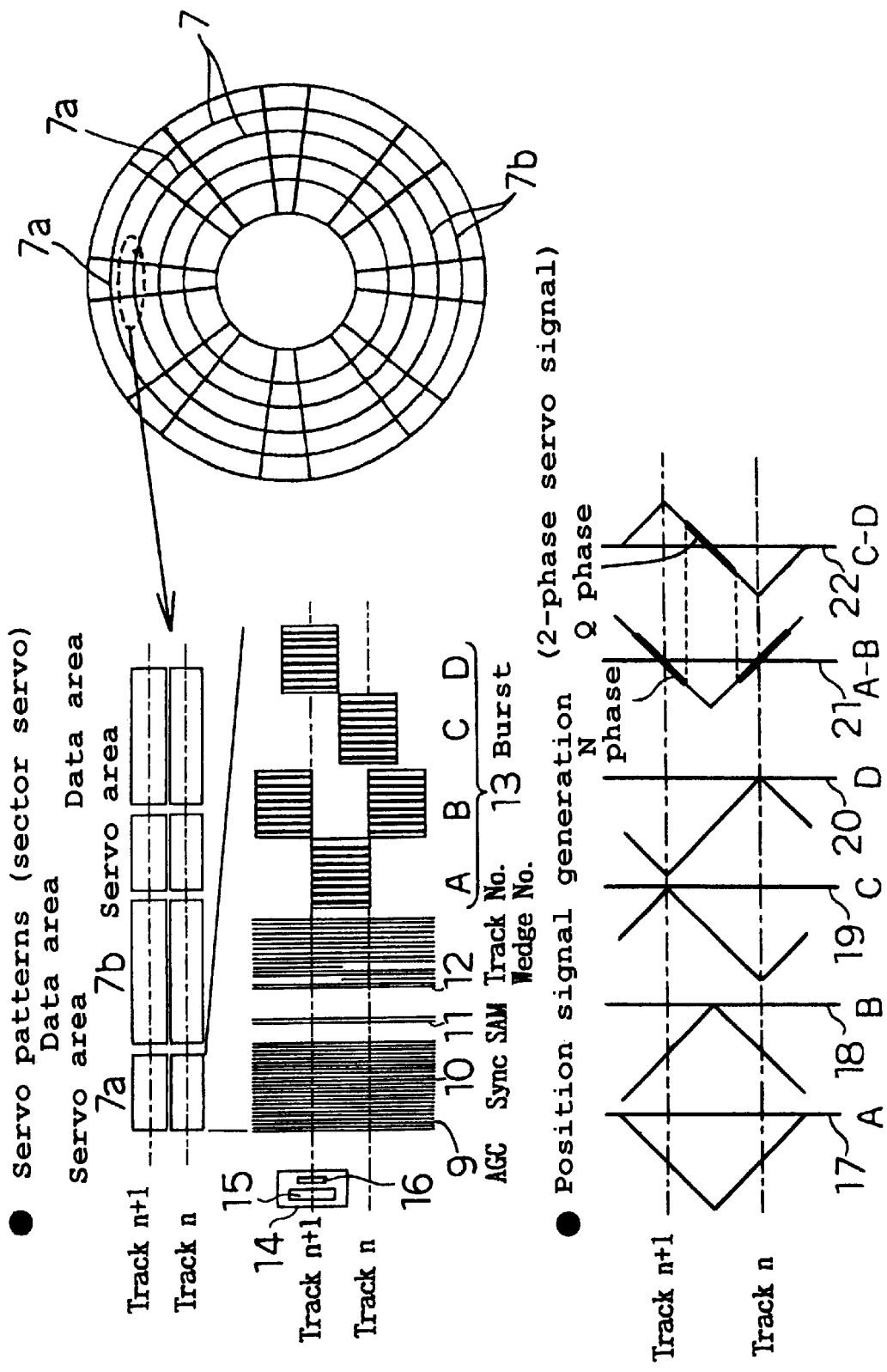
FIG. 10 is a drawing explaining 2-phase servo signals of a conventional magnetic disk.

As explained in Prior Art, in case of a conventional magnetic disk, tracks are arranged in concentric circles as on the magnetic disk 1 in FIG. 8.

Figure 11:
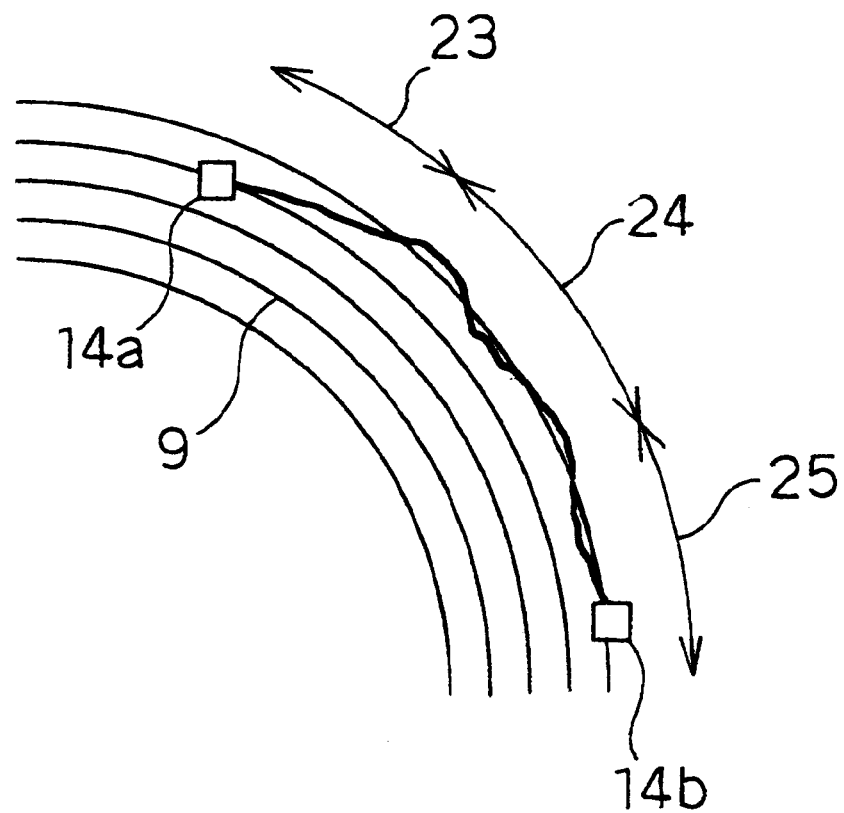
FIG. 11 is a drawing showing that the recording and playback performance of a magnetic disk apparatus falls to seek and settling operations in Embodiment 1 of present invention.

Consequently, when AV data is recorded or played back as shown in FIG. 11, seek 23 operations, which are operations for moving between tracks, must be performed. By means of a seek 23 operation, a move is made from the current position (position of head 14a) to the vicinity of the target track in the shortest possible time. However, as the head oscillates even after the seek operation, settling 24, which is an operation to stabilize this oscillation at the center of the target track (position of head 14b), is performed. After settling 24 is performed, the head 14b is accurately positioned. After this, data recording or playback is performed. During data recording and playback, also, control is necessary to ensure that the head 14b is correctly positioned at the target track. As the rotating disk generates various vibrations, and the head 14b also vibrates, a following operation is necessary to follow the track. Thus head 14b positioning operations broadly consist of three modes: seek, settling, and following.

When AV data is recorded on a magnetic disk apparatus, AV data compressed using MPEG1, MPEG2-PS (program stream), MPEG2-TS (transport stream), etc., is recorded and played back on the present embodiment of the magnetic disk apparatus. Although the data is compressed, a large volume of data must still be transferred in order to obtain clear picture quality in Hi-Vision and similar high-definition television programs. Moreover, since such large-volume data is recorded and played back continuously, and the magnetic head 2 cannot perform recording or playback while seek 23 operations or settling 24 operations in FIG. 11 are being executed, continuous transfer performance cannot be secured during AV data playback, partial halting of video and voice data (frame lapses) will occur, and transfer efficiency will fall, as stated in Problems to be Solved by the Invention.

In order to solve these problems, in the present embodiment the track on the magnetic disk 26 in FIG. 1 is arranged in a spiral.

AV data is data which is continuously sent in time during recording, and played back continuously in time during playback. When recording or playing back this AV data, all that is necessary is to record or play back the AV data continuously on the spiral track on the magnetic disk 26.

As a continuous track is used on the magnetic disk 26 when recording or playing back AV data, the seek 23 and settling 24 operations in FIG. 11 are unnecessary. As a result, performance is improved by 30% or more compared with the magnetic disk apparatus described in Prior Art, and the method is particularly effective for data that is transferred continuously in time, such as AV data.

On the magnetic disk 26, a spiral is formed counterclockwise so that the carriage 3a achieves coordination with the rotation of the disk 26, but if the carriage 3a is installed not on the right-hand side but on the left-hand side, as shown in FIG. 1, the spiral can also be formed clockwise in order to achieve coordination with the rotation of the magnetic disk 26.

When the magnetic disk 26 with tracks formed spirally in this way performs information recording and playback, it is rotated at a given speed (5,400 rpm in the present embodiment) by the spindle motor (not illustrated). At this time, the magnetic head 2 is positioned above the magnetic disk 26 by means of the actuator 3, and is maintained in a floating state in the position at which the pressure of the suspension 3b provided at the tip of the actuator 3, and the active force of the airflow between the slider formed integrally with the magnetic head 2 and the magnetic disk 26 are in balance. Position information (b in the drawing) is recorded in advance on each of the spiral tracks on the magnetic disk 26. The position information b is recorded at fixed intervals on each track.

Figure 2:
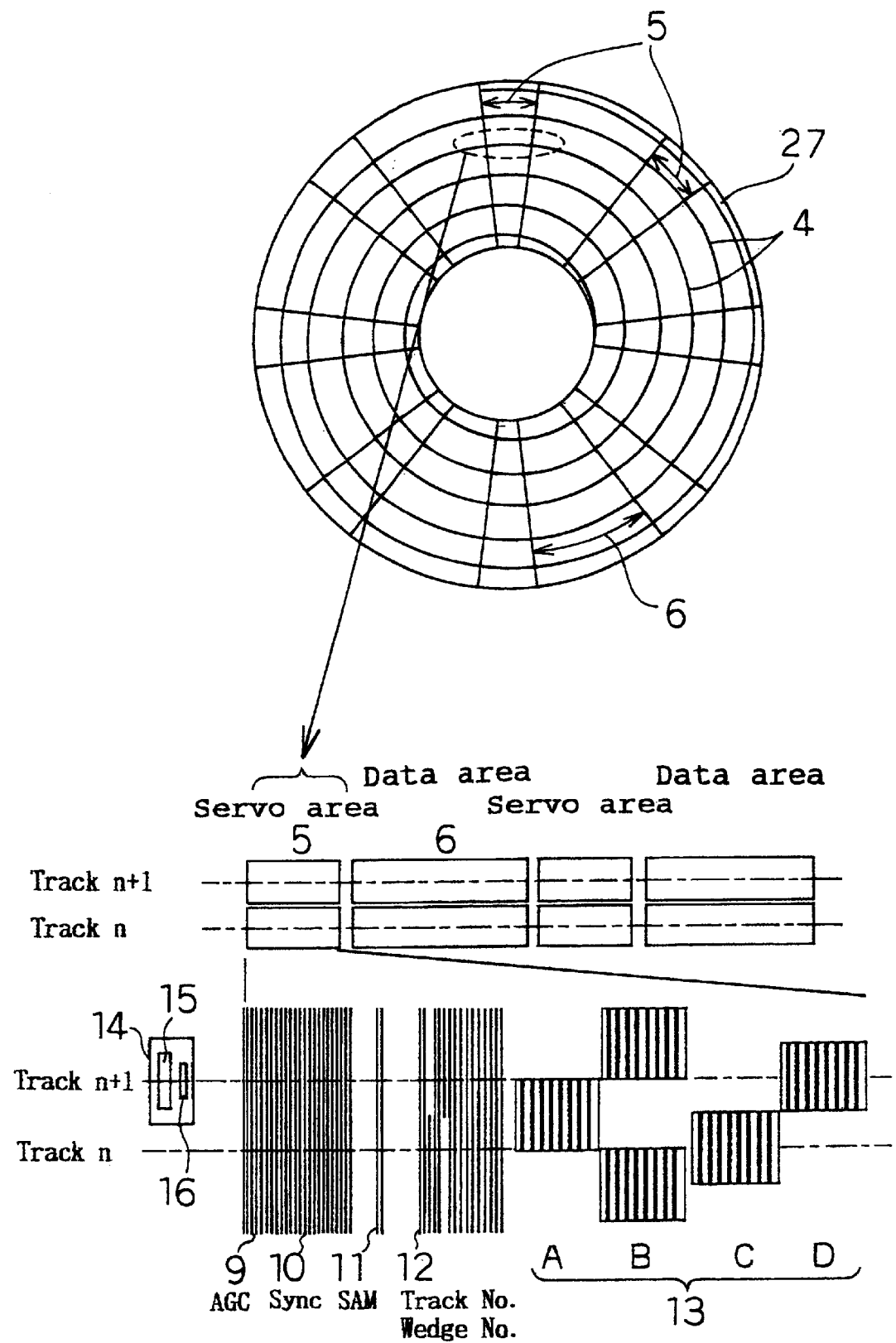
FIG. 2 is a drawing showing the configuration of servo areas in Embodiment 1 of the present invention.

FIG. 2 shows tracks 4 and servo areas 5 and data areas 6 composed of tracks on a magnetic disk 26 with tracks arranged spirally.

The magnetic head 2 plays back position information at fixed time intervals in accordance with the rotation of the magnetic disk 26 (this time interval is called the sampling period, and the reciprocal of the sampling period is called the sampling frequency, which is 5.4 kHz in the present embodiment, as in the prior art). The magnetic head 2 playback signal is detected and amplified by the head amplifier 5, and input to the controller 4. In the controller 4, position information is detected from the input signal, the positional error relative to the target track a of the magnetic head 2 at that time is computed, the control amount necessary to drive the actuator 3 in order to reduce this positional error is computed, and a control signal is output. In this case, a control method such as phase compensation, for example, is used. The driver 6 supplies the necessary current to the drive coil 3c of the actuator 3 on the basis of the input control signal. By this means, a driving force is generated by the drive coil 3c and the permanent magnet 3d located opposite, and the actuator rotates about point c and constantly positions the magnetic head 2 above the target track a. In this state, information recording and playback is performed on the data area by the magnetic head 2. When information recording and playback is performed in this way, a closed loop positioning control system that positions the magnetic head 2 above the target track is used.

As shown in FIG. 2, the tracks 4 are configured by servo areas 5 and data areas 6. The method of positioning the head 14 in the servo area 5 is the same as in the prior art, and so the description of this is omitted here.

By arranging the tracks on the magnetic disk spirally in this way as in the present embodiment, it is possible to record and play back AV data efficiently.

Next, the method of arranging the tracks spirally will be explained, by using FIGS. 4 to 7.

The writing of positioning information in the servo areas of the magnetic disk is usually carried out using a servo track writer, but this requires highly accurate positioning technology and takes from several tens of minutes to several hours. Also, writing servo sectors with a servo track writer is virtually impossible for a magnetic disk with tracks arranged spirally, as described in the present embodiment because it requires a long time and the resulting cost becomes very high.

Thus, with the present embodiment, the configuration and operation will be described for the case where positioning information is written to the servo areas by magnetic transfer using a master information disk in order to pre-format a magnetic disk with tracks arranged spirally.

Figure 4:
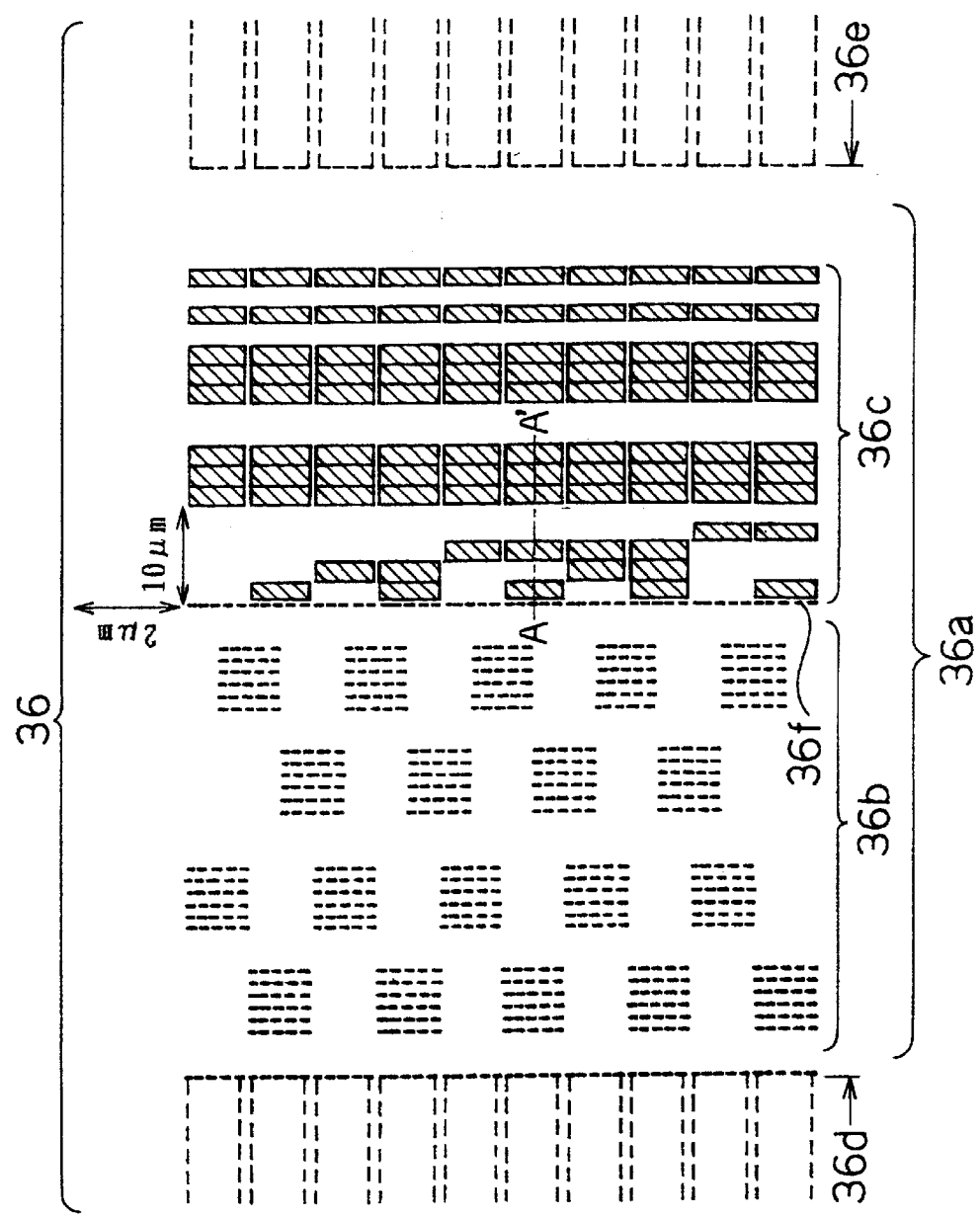
FIG. 4 is a drawing showing patterns in servo areas of the master information disk in Embodiment 1 of the present invention.

FIG. 4 shows patterns on the master information disk 36 arranged spirally. The master information disk 36 has a servo area 36a, and the servo area 36a further comprises a tracking servo area 36b and an address information area 36c. At either side of the servo area 36 are data areas 36d and 36e.

The present embodiment will be explained with reference to cross-section A–A' of the master information disk 36.

Figure 5:
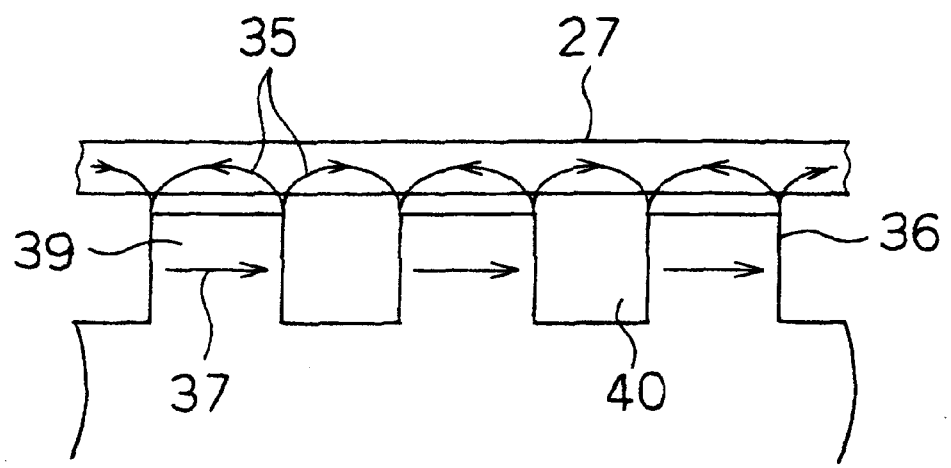
FIG. 5 is a drawing explaining the case where magnetized patterns of the master information disk are transferred to a magnetic disk in Embodiment 1 of the present invention.

FIG. 5 shows the case where the magnetized patterns of the master information disk are transferred to a magnetic disk.

The master information disk 36 is brought into close proximity to the magnetic disk 27, and stationed there. By this means, the magnetized patterns on the master information disk 36 are transferred to the magnetic disk 27.

The master information disk 36 has projections 39 and depressions 40. The projections 39 are magnetized by magnetization of the ferromagnetic substance of the projections 37. As magnetic resistance variations occur on the surface of the master information disk 36 due to the projections and depressions, a recording magnetic field 35 is generated by magnetization of the ferromagnetic material of the projections 37. This recording magnetic field 35 has the reverse polarity of the surfaces of the projections 39 and the surfaces of the depressions 40, with the result that patterns of recording magnetization 38 corresponding to the projections and depressions are recorded on the magnetic disk 27 as shown in FIG. 6.

Figure 6:
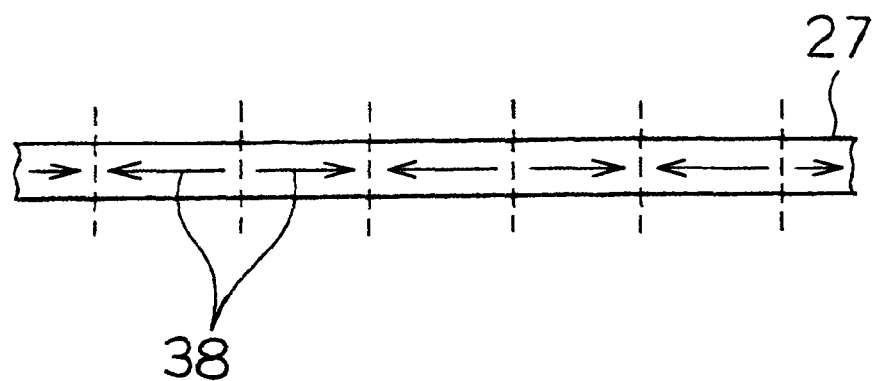
FIG. 6 is a drawing showing a magnetic disk to which a magnetized pattern has been transferred by means of the master information disk in Embodiment 1 of the present invention.

FIG. 6 shows the situation where the recording magnetic field 35 is transferred to the magnetic disk 27, and the magnetic disk is magnetized with the prescribed magnetic pattern. The recording magnetization 38 is of opposite polarity to the projections 39 and depressions 40.

Figure 7:
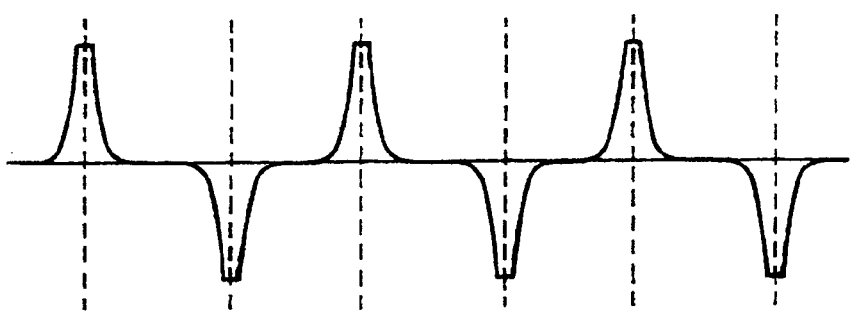
FIG. 7 is a drawing showing the playback waveform of a magnetic disk to which a magnetized pattern has been transferred by means of the master information disk in Embodiment 1 of the present invention.

FIG. 7 shows the playback waveform when the magnetic disk 27 to which a magnetic pattern has been transferred is played back. This is basically the same as for a conventional magnetic disk preformatted with a servo track writer.

Next, the method of creating the minute projections and depressions provided on the surface of the master information disk 36 will be described.

Such fine patterns of projections and depressions can easily be formed using various micro-processing techniques employed in the master stamper formation process for optical disk stamping, in semiconductor processes, and so forth.

As in photolithography and other lithographic techniques using laser beams or electron beams, in particular, fine patterns of projections and depressions can be formed by exposing and developing a resist film, then performing dry etching. Also, to form a fine pattern of projections and depressions with high precision, micro-processing can be carried out directly by means of a laser, electron beam, or ion beam, without using a resist film.

If a ferromagnetic film is formed on the surface of the fine patterns of projections and depressions formed in this way, a master information disk 36 can be fabricated.

As apparent from the above explanation, a master information disk 36 with fine patterns of projections and depressions and spiral tracks can be easily fabricated, and by transferring these to a magnetic disk 27, a magnetic disk 27 with spiral tracks can be fabricated in very low cost.

(Embodiment 2)

Next, Embodiment 2 will be explained with reference to FIG. 3.

Figure 3:
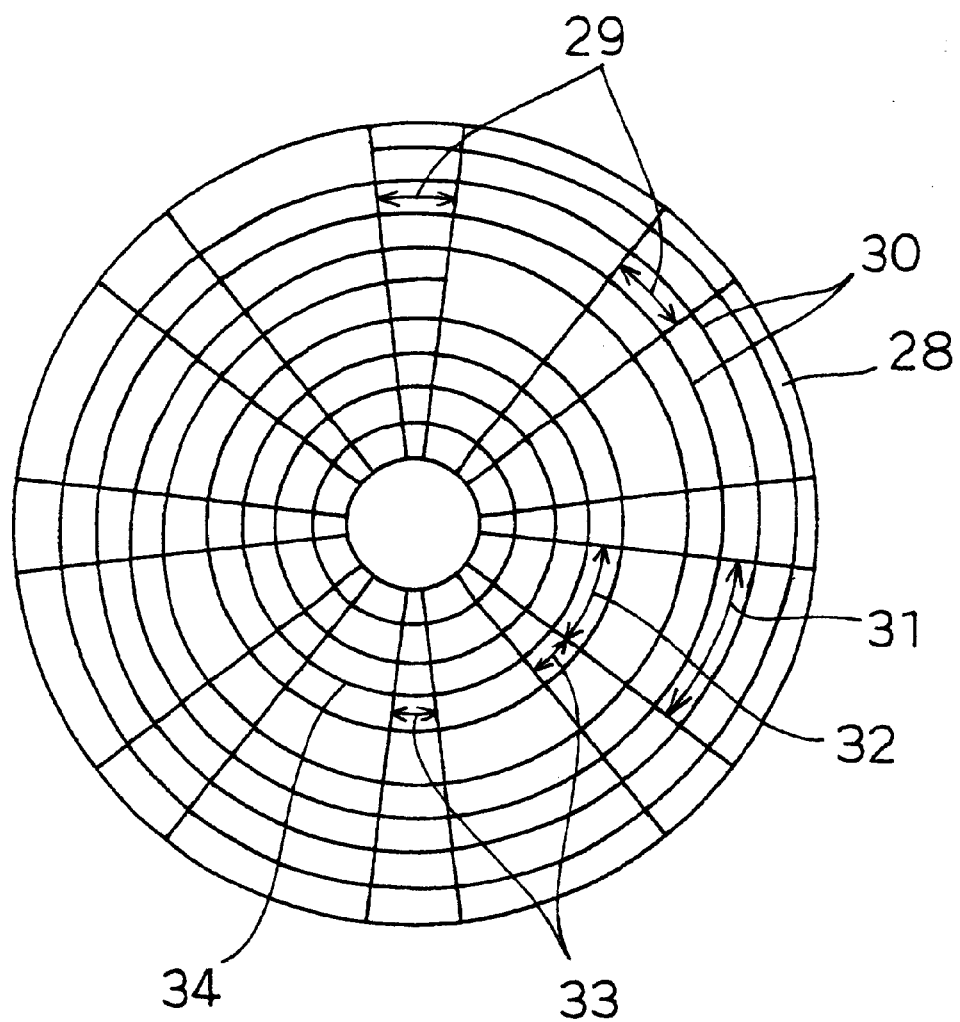
FIG. 3 is a drawing showing a magnetic disk provided with both a zone with spiral tracks and a zone with concentric-circle tracks in Embodiment 2 of the present invention.

FIG. 3 shows an example of a magnetic disk in which the magnetic disk 28 is divided into two zones, and whereby both recording and playback of AV data, and access to data that is not transferred continuously in time, such as computer data, can be performed efficiently.

For data that requires real-time handling, such as AV data, spiral tracks that do not need seek or settling operations can be processed more efficiently. In case of computer data and programs, on the other hand, concentric-circle tracks are more easily handled.

The magnetic disk 28 is divided into two zones. In the zone further from the center of rotation of the magnetic disk 28 (the outer zone), the tracks are formed in a spiral, while in the zone nearer to the center of rotation (the inner zone), the tracks are formed as concentric circles.

The outer zone has spiral tracks 30, and the tracks 30 have servo areas 29 and data areas 31.

The inner zone has concentric-circle tracks 34, and the tracks 34 have servo areas 33 and data areas 32.

A gap is provided between the outer zone and the inner zone to prevent interference between the spiral track servo areas (especially the burst patterns) and the concentric-circle track servo areas (especially the burst patterns). The gap need only be sufficiently large to prevent servo area interference; in the present embodiment, there is a gap of one track between the last servo area of the innermost spiral track in the outer zone and the servo area of the inner concentric-circle track.

When recording and playing back AV data as described in Embodiment 1, AV data recording and playback can be performed efficiently if the outer zone of the magnetic disk 28 is used, since the outer zone generally enables a high data transfer speed to be achieved.

When accessing data such as computer data, data access can be performed efficiently if the inner zone of the magnetic disk 28 is used.

In the present embodiment, spiral tracks are provided in the outer zone, and concentric-circle tracks are provided in the inner zone, but if computer or similar data is recorded and played back more frequently because of the application, the concentric-circle tracks can be provided in the outer zone, and the spiral tracks in the inner zone.

This kind of magnetic disk 28 can easily be fabricated using the master information disk fabrication method described in Embodiment 1.

Also, if this magnetic disk 28 is used instead of the magnetic disk 26 in FIG. 1 shown in Embodiment 1, it is possible to provide a magnetic-disk apparatus that can access or record and play back both computer or similar data and AV data.

The master information disk for fabricating a magnetic disk that configures the magnetic disk apparatus set forth in claim 1 of the present invention is also included in the present invention.

Further, the magnetic disk used in the magnetic disk apparatus of the present invention, and the magnetic disk itself fabricated by means of the master information disk of the present invention, are also included in the present invention.

Further, with regard to the magnetic disk apparatus of the present invention, the description covered the sector servo currently used as the mainstream type, but the present invention can be applied not only to this type, but also to a dedicated servo, whereby the disk apparatus is equipped with a plurality of disks, one surface of which is a dedicated servo surface, with that surface bearing consecutive servos, and data being recorded and played back on other surfaces by other heads.

Still further, the magnetic disks themselves that configures the magnetic disk apparatus in the case where the present invention is applied to a dedicated servo are also included in the present invention.

POTENTIAL FOR EXPLOITATION IN INDUSTRY

As apparent from the above explanation, the present invention enables the provision of a magnetic disk apparatus and a master information disk that make it possible to record and play back efficiently data that is transferred continuously in time, and make it possible to perform magnetic disk preformatting in a short time and without incurring cost.

What is claimed is:

1. A magnetic disk apparatus comprising:

a head that performs data recording and playback while moving relative to a magnetic disk rotating at the prescribed speed;

an actuator that positions said head relative to said magnetic disk; and a controller that detects the position of said head by means of servo sector that have positioning information recorded magnetically on said magnetic disk and performs control to position said actuator by means of this detection signal, wherein said magnetic disk has at least a part in which the arrangement of tracks having at least said servo sectors is spiral, and a ferromagnetic substance thin layer or ferromagnetic powder coating layer is formed on the surface of said magnetic disk, and with regard to the master information disk, depressions and projections corresponding to said positioning information are formed on the surface of the disk substrate, and at least the raised surfaces of said depressions and projections are a ferromagnetic substance, and said depressions and projections are formed in a spiral, and by bringing the surface of the master information disk into contact with the surface of said magnetic disk, a magnetized pattern corresponding to said depressions and projections is recorded, and the magnetized pattern includes a spiral track formation having a servo sector and a data sector, both formed on the same spiral track, and the servo sector includes burst patterns having differing phases for providing servo control.

2. A magnetic disk apparatus according to claim 1, wherein said magnetic disk comprises an area in which the tracks are formed spirally, and an area in which the tracks are formed in concentric circles.

3. A magnetic disk apparatus according to claim 2, wherein the area in which said tracks are formed in concentric circles is formed on the side nearer the center of rotation of said magnetic disk, and the area in which said tracks are formed spirally is formed on the side further from said center of rotation.

4. A magnetic disk apparatus according to claim 2 or claim 3, wherein the area in which said tracks are formed spirally and the area in which said tracks are formed in concentric circles are arranged with the provision of intervals to prevent said servo sector positioning information of at least said mutually adjacent areas from overlapping.

5. A master information disk comprising a disk substrate on which depressions and projections corresponding to positioning information held by the servo sectors are formed, wherein at least the raised surfaces of said depressions and projections are magnetized, and at least part of said depressions and projections are formed in a spiral on said disk substrate, and which is used to record a magnetized pattern corresponding to said depressions and projections on a magnetic disk by being brought into contact with said magnetic disk.

6. A method for forming magnetic patterns on a disk comprising the steps of:

(a) forming projections and depressions on a master disk;

(b) depositing a ferromagnetic film on the projections and depressions;

(c) magnetizing the projections and depressions to form magnetic patterns configured in a spiral track formation on the master disk wherein the magnetic patterns include a servo sector and a data sector both formed on the same spiral track, and the servo sector includes burst patterns having differing phases for providing servo control;

(d) placing the disk adjacent to the master disk; and (e) transferring the magnetic patterns from the master disk to the disk, whereby the magnetic patterns on the disk are configured in the spiral formation of the master disk.

* * * * *

UNITED STATES PATENT AND TRADEMARK OFFICE
CERTIFICATE OF CORRECTION

PATENT NO. : 6,466,385 B1
DATED : October 15, 2002
INVENTOR(S) : Umeda et al.

It is certified that error appears in the above-identified patent and that said Letters Patent is hereby corrected as shown below:

Column 6,
Line 6, after the word "falls" insert -- due --
Line 32, delete "Brst" and substitute therefor -- Burst --

Signed and Sealed this

Twenty-seventh Day of May, 2003

JAMES E. ROGAN
*Director of the United States Patent and Trademark Office*